United States Patent
Sunaga et al.

(10) Patent No.: US 6,877,669 B2
(45) Date of Patent: Apr. 12, 2005

(54) CONTROL APPARATUS OF AIR CONDITIONING SYSTEM

(75) Inventors: Hideki Sunaga, Tokyo (JP); Kaoru Tanaka, Tokyo (JP); Futoshi Araki, Tokyo (JP); Eiji Takahashi, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/731,100

(22) Filed: Dec. 10, 2003

(65) Prior Publication Data

US 2004/0112071 A1 Jun. 17, 2004

(30) Foreign Application Priority Data

Dec. 10, 2002 (JP) ........................................ 2002-357667

(51) Int. Cl.[7] .............................................. G05D 23/00
(52) U.S. Cl. .......................................... 236/51; 62/125
(58) Field of Search .......................... 236/51; 62/125, 62/165, 212

(56) References Cited

U.S. PATENT DOCUMENTS

| | | | | |
|---|---|---|---|---|
| 5,160,115 A | * | 11/1992 | Ito et al. ................ | 251/129.12 |
| 5,350,187 A | * | 9/1994 | Shinozaki ............ | 280/124.102 |
| 5,623,169 A | * | 4/1997 | Sugimoto et al. .......... | 307/10.1 |
| 5,653,315 A | * | 8/1997 | Ekquist et al. ........... | 188/266.4 |
| 5,706,190 A | * | 1/1998 | Russ et al. ..................... | 700/9 |
| 5,801,940 A | * | 9/1998 | Russ et al. ..................... | 700/9 |
| 5,918,172 A | * | 6/1999 | Saunders et al. ......... | 455/404.1 |
| 6,007,345 A | * | 12/1999 | Francis et al. ................ | 439/34 |
| 6,031,226 A | * | 2/2000 | Parekh et al. ............ | 251/250.5 |
| 6,260,675 B1 | * | 7/2001 | Muhlenkamp .............. | 188/267 |
| 6,311,810 B1 | * | 11/2001 | Hopkins et al. ......... | 188/267.2 |
| 6,719,358 B2 | * | 4/2004 | Schmidt et al. ............. | 296/152 |
| 6,739,640 B2 | * | 5/2004 | Schmidt et al. .......... | 296/37.13 |
| 2002/0096573 A1 | | 7/2002 | Bruzy et al. | |

FOREIGN PATENT DOCUMENTS

| | | |
|---|---|---|
| DE | 198 28 259 A1 | 12/1999 |
| EP | 1 155 885 A2 | 11/2001 |
| EP | 1 226 989 A1 | 7/2002 |
| EP | 1 323 589 A1 | 7/2003 |
| JP | 10-006748 A | 1/1998 |
| JP | 10006749 A * | 1/1998 |
| JP | 02000335331 A * | 12/2000 |

* cited by examiner

Primary Examiner—William Doerrler
Assistant Examiner—Mohammad M. Ali
(74) Attorney, Agent, or Firm—Foley & Lardner LLP

(57) ABSTRACT

Electrical circuits (35a)–(37a) and exclusive ICs (35b)–(37b) which are for data communication are respectively included inside of a housing of actuator side connectors (22')–(24') of a harness assembly (30) which connects an A/C amplifier unit (16) and actuators (40), (50) and (60), and the actuator side connectors (22')–(24') are formed in a configuration possible to be connected to connectors (41)–(61) of the actuators (40)–(60) which are used in a door control apparatus which is designed not to carry out the data communication.

7 Claims, 2 Drawing Sheets

CONTROL APPARATUS OF AIR CONDITIONING SYSTEM

BACKGROUND OF THE INVENTION

1. Field of the Invention

The present invention relates to a control apparatus of an air conditioning system in a vehicle, more specifically, to a door control apparatus of the air conditioning system which controls an actuator by means of data communication by networking an amplifier unit of an air conditioner and the actuator for opening and closing of a door.

2. Description of the Prior Art

Conventionally in an air conditioning system for an automobile, a driving control device (an amplifier unit of an air conditioner) and actuators provided correspondingly to a plurality of doors (for example, valves) and for adjusting respective divergence of the plurality of doors which are for controlling air flow flowing in an air passage within the air conditioning system and provided in that air passage, are connected by an interface (harness), and the doors are opened and closed by actuation of the actuators by sending an electrical signal from the amplifier unit of the air conditioner through the harness to desired actuator.

Namely, as shown in FIG. 2A for example, a control apparatus (door control apparatus) of an air conditioning system 100 is provided with various actuators such as an actuator of a mix door for opening and closing an air mix door 40, a mode actuator for opening and closing a door for switching over modes 50 and a Fresh/Re-circulating intake actuator for opening and closing a door for switching over Fresh/Re-circulating intake 60, a driving control device (an amplifier unit of an air conditioner) 10 which individually drives and controls each of those actuators, and an interface (harness assembly, harness with connectors) 20 which connects the amplifier unit of the air conditioner 10 and each of the actuators 40, 50 and 60.

Here, each of the actuators 40, 50 and 60 has electrical circuits 43, 53 and 63 which are including motors or the like inside of them respectively, and are provided with connectors 41, 51 and 61 for connecting these electrical circuits 43, 53 and 63 which are located inside to the harness assembly 20.

Also, the amplifier unit of the air conditioner 10 is provided with a microcomputer 11 for carrying out computation in accordance with predetermined program for control by receiving an input signal from external sensors and switches or the like which are not shown and by receiving electrical power from an electrical power supply, driver ICs 13, 14 and 15 which are provided corresponding to each of the actuators 40, 50 and 60 and are for individually supplying the electrical power to each of the actuators 40, 50 and 60 according to result of the computation of the microcomputer 11, and a connector 12 which is used to be connected to the harness assembly 20.

The harness assembly 20 has an amplifier side connector 21 connected to the amplifier unit of the air conditioner 10 on one end side of the harness, and actuator side connectors 22, 23 and 24 connected to each of the actuators 40, 50 and 60 on the other end side.

In the door control apparatus structured as above, each of the driver ICs 13, 14 and 15 is mutually connected (parallel communication) to the respective actuators 40, 50 and 60 respectively via the harness assembly 20, and each of the driver ICs 13, 14 and 15 only outputs the electrical power to the actuator connected to each of them, thereby the actuators are driven.

By the way, recently in the above described door control apparatus, it has been proposed that doors are controlled to be opened and closed by means of data communication utilizing network by networking the amplifier unit of the air conditioner and the actuators which are for driving the doors in the air passage to be opened and closed (Japanese Patent Laid Open No. H10-6748).

As shown in FIG. 2B, this networked control apparatus (door control apparatus) 100 is provided with various actuators such as an actuator of air mix door 70, a mode actuator 80 and a Fresh/Re-circulating intake actuator 90, a driving control device (amplifier unit of an air conditioner) 16 and an interface (harness assembly) 30. Each of the actuators 70, 80 and 90 has exclusive ICs 72, 82 and 92 which are used exclusively for data communication other than electrical circuits 73, 83 and 93 which are including motors or the like inside of them respectively, and the amplifier unit of the air conditioner 16 is structured to have only a microcomputer 17 and is not equipped with driver ICs.

In addition, an amplifier side connector 31 of the harness assembly 30 is connected to a connector 18 of the amplifier unit of the air conditioner 16, and actuator side connectors 32, 33 and 34 are connected to connectors 71, 81 and 91 of the respective actuators 70, 80 and 90.

In this networked door control apparatus as described above, each of the plurality of actuators 70, 80 and 90 is connected to the amplifier unit of the air conditioner 16 without transiting the driver ICs, and the amplifier unit of the air conditioner 16 simultaneously outputs an electric signal which drives and controls the respective actuators 70, 80 and 90 and a selection signal for specifying only the certain actuator to be driven. Additionally, the exclusive ICs 72, 82 and 92 which are used exclusively for the data communication provided inside of the respective actuators 70, 80 and 90 receive the selection signal, and if the selection signal is a selection signal specifying the corresponding actuator corresponds to each of the exclusive ICs 72, 82 and 92, that exclusive IC outputs the electric signal to the connected actuator, thereby the door is structured to be opened and closed by the actuation of the actuator. More specifically, a plurality of actuators is controlled by a serial communication using the selection signal.

Meanwhile, between the networked door control apparatus (FIG. 2B) and the traditional non-networked door control apparatus (FIG. 2A), not only the amplifier unit of the air conditioner and the harness assembly differ but also each of the actuators differ.

Accordingly, in a certain type of automobile for example, when both of the one which is networked and does data communication (hereinafter referred to as "with data communication") and the one which is non-networked and does not do the data communication (hereinafter referred to as "without data communication") are set, and either of them is to be alternatively selected according to grade of that type of automobile or with or without of options or the like, it is necessary to prepare components corresponded to the one with data communication and components corresponded to the one without data communication respectively, as a result, there have been problems that it is troublesome to manage the various kinds of those components as well as lowering in production cost by mass production becomes less.

SUMMARY OF THE INVENTION

The present invention has been made in view of the above described circumstances, therefore, it is an object of the present invention to provide a control apparatus of an air conditioning system capable of reducing trouble in components management and is inexpensive in production cost.

In the control apparatus (door control apparatus) of the air conditioning system relating to the present invention, connection configuration of a connector of an interface (harness) that is to be connected to an actuator is identical regardless of whether or not to carry out data communication between a driving control device (amplifier unit of an air conditioner) and the actuator, and in a door control apparatus which carries out the data communication, a circuit for data communication, which has been provided in the actuator, is included in the connector of the harness.

More specifically, a control apparatus of an air conditioning system relating to the present invention comprises an actuator provided in a door used for the air conditioning system for opening and closing the door; an amplifier unit of an air conditioner for driving and controlling the actuator; and a harness with connectors which has an actuator side connector which is to be connected to the actuator on one end. In addition, two types of the harness with connectors are prepared according to with or without data communication with the actuator. Furthermore, within the two types of harness with connectors, the actuator side connector of the harness with connectors which corresponds to the "with data communication" is identical in connection configuration with the actuator side connector of the harness with connectors which corresponds to the "without data communication", and is included with a circuit for the data communication.

Here, the identical connection configuration means that when the actuator side connector of the harness with connectors which corresponds to "without data communication" can be connected to the connection connector provided in the actuator as a connection partner, the actuator side connector of the harness with connectors which corresponds to "with data communication" is in a configuration capable of being connected to the connection connector of that actuator, and does not necessarily means that the actuator side connector of the harness with connectors which corresponds to "with data communication" is in identical configuration physically with the actuator side connector of the harness with connectors which corresponds to "without data communication".

Therefore, within a plurality of connection terminals arranged inside of the actuator side connector, for example there may be a connection terminal that only exists in the actuator side connector which corresponds to "without data communication" and a connection terminal that does not functionally exist in the actuator side connector which corresponds to "with data communication". In such case, it is not necessary to provide the functionally needless terminal as a dummy terminal so as to be physically identical, and even in such case that the configurations of the actuator side connectors are not physically identical, it substantially corresponds to the above described "identical connection configuration".

Similarly to a configuration in housing of the actuator side connector, if the housing is in a configuration capable of being connected with the connection connector of the actuator by forming a helical groove or the like thereto, it also substantially corresponds to the above described "identical connection configuration".

BRIEF DESCRIPTION OF THE ATTACHED DRAWINGS

DETAILED DESCRIPTION OF THE PREFERRED EMBODIMENT

Hereinafter, a specific embodiment of a control apparatus (door control apparatus) of an air conditioning system relating to the present invention will be described with reference to the accompanying drawings.

Figure 1:
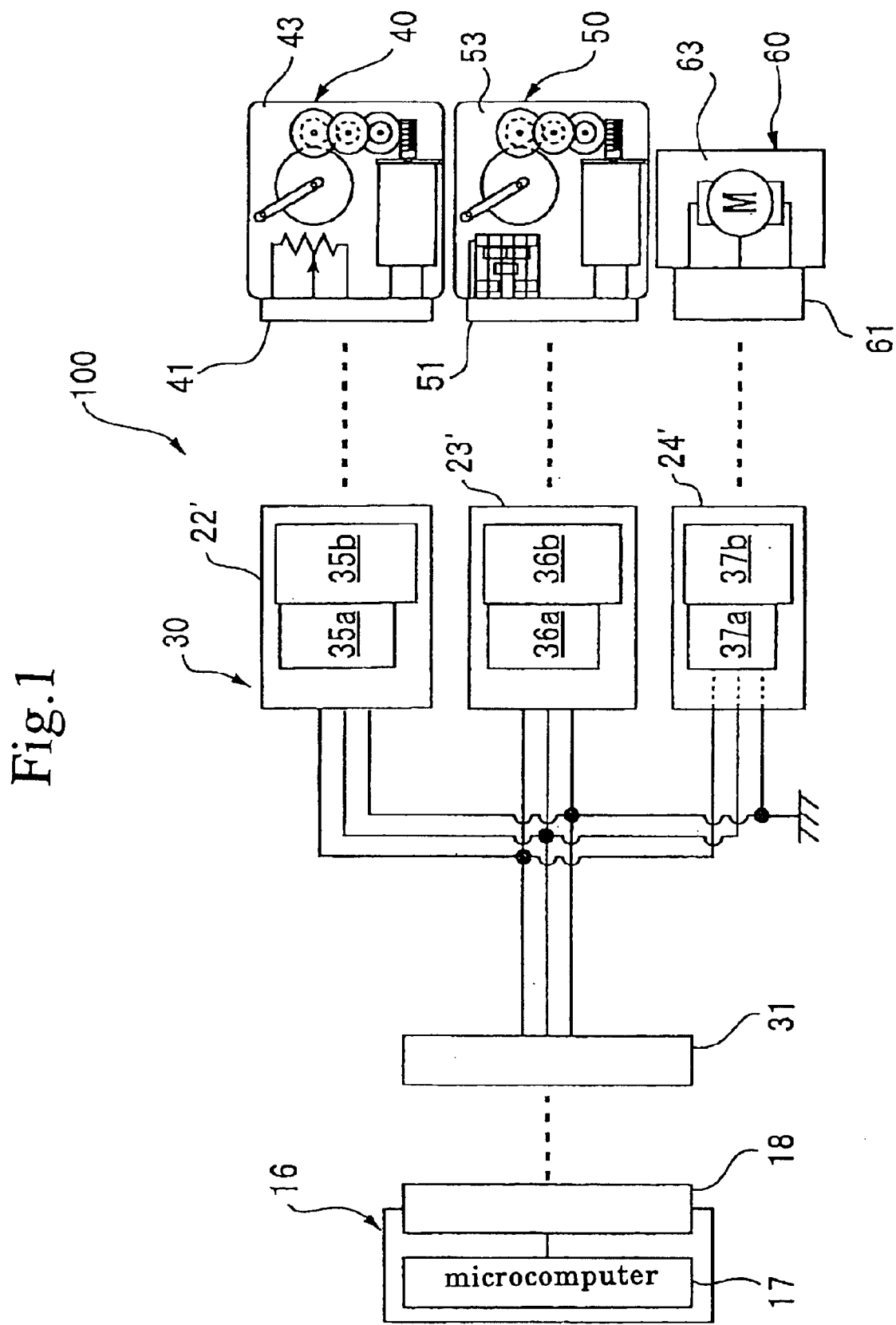
FIG. 1 is a schematic view showing a control apparatus of an air conditioning system relating to one embodiment of the present invention.

FIG. 1 is a schematic view showing a control apparatus (door control apparatus) 100 of the air conditioning system relating to one embodiment of the present invention.

Meanwhile, a "door" as referred in the present embodiment includes a case in which it is a "valve".

The door control apparatus 100 which is shown in the drawing of FIG. 1 is provided with an actuator of a mix door for opening and closing an air mix door 40, a mode actuator for opening and closing a door for switching over modes 50, and a Fresh/Re-circulating intake actuator for opening and closing a door for switching over Fresh/Re-circulating intake 60, a driving control device (amplifier unit of an air conditioner, hereunder referred to as A/C amplifier unit) 16 which individually drives and controls each of those actuators 40, 50 and 60, and an interface (harness assembly, harness with connectors) 30 which connects the A/C amplifier unit 16 and each of the actuators 40, 50 and 60.

Here, each of the actuators 40, 50 and 60 has electrical circuits 43, 53 and 63 which are including motors or the like inside of them respectively, and are provided with connectors 41, 51 and 61 for connecting these electrical circuits 43, 53 and 63 which are located inside to the harness assembly 30.

Also, the A/C amplifier unit 16 is provided with a microcomputer 17 for carrying out computation in accordance with predetermined program for control by receiving an input signal from external sensors and switches or the like which are not shown and by receiving electrical power from an electrical power supply, and a connector 18 which is used to be connected to the harness assembly 30. The A/C amplifier unit 16 outputs a driving control signal for controlling the respective actuators 40, 50 and 60 and an identification signal for specifying one or more of the respective actuators 40, 50 and 60 to which the driving control signal is to be received.

The harness assembly 30 has an amplifier side connector 31 which is connected to the connector 18 of the A/C amplifier unit 16 on one end side of the harness, and actuator side connectors 22', 23' and 24' which are connected to the respective connectors 41, 51 and 61 of each of the actuators 40, 50 and 60 on the other end side.

In addition, an electrical circuit for data communication 35a and exclusive IC 35b are included and installed inside of a housing of the actuator side connector 22'.

Electrical circuits for data communication 36a, 37a and exclusive ICs 36b, 37b are also respectively included and installed inside of other housings of the actuator side connector 23' and the actuator side connector 24', similarly.

Here, the electrical circuits 35a–37a and the exclusive ICs 35b–37b, which are provided inside of the housings of respective actuator side connectors 22'–24', are exclusive circuits which are exclusive for carrying out the data communication between the A/C amplifier unit 16 and each of the actuators 40–60.

The harness assembly 30 as structured as above receives the driving control signal from the A/C amplifier unit 16 as well as the identification signal outputted from the A/C amplifier unit 16. Subsequently, the electrical circuits for data communication 35a–37a and the exclusive ICs 35b–37b which are provided inside of the housings of the actuator side connector 22'–24' judges the received identification signal which is for specifying the respective actuators 40, 50 and 60, and if judged that the identification signal is an identification signal specifying the corresponding actuator corresponds to each of the electrical circuit for data communication and the exclusive ICs, then output the driving control signal from the A/C amplifier unit 16 to the actuator connected to the corresponding connector.

More specifically, the door control apparatus 100 is networked (serial communication) by the A/C amplifier unit 16 and each of the actuators 40–60 as LAN (Local Area Network). Driving and controlling of each of the actuators 40–60 by the A/C amplifier unit 16 are carried out by the data communication utilized in this LAN, and the A/C amplifier unit 16 and the harness assembly 30 are used as exclusive components which are used exclusively for "with data communication".

Figure 2A:
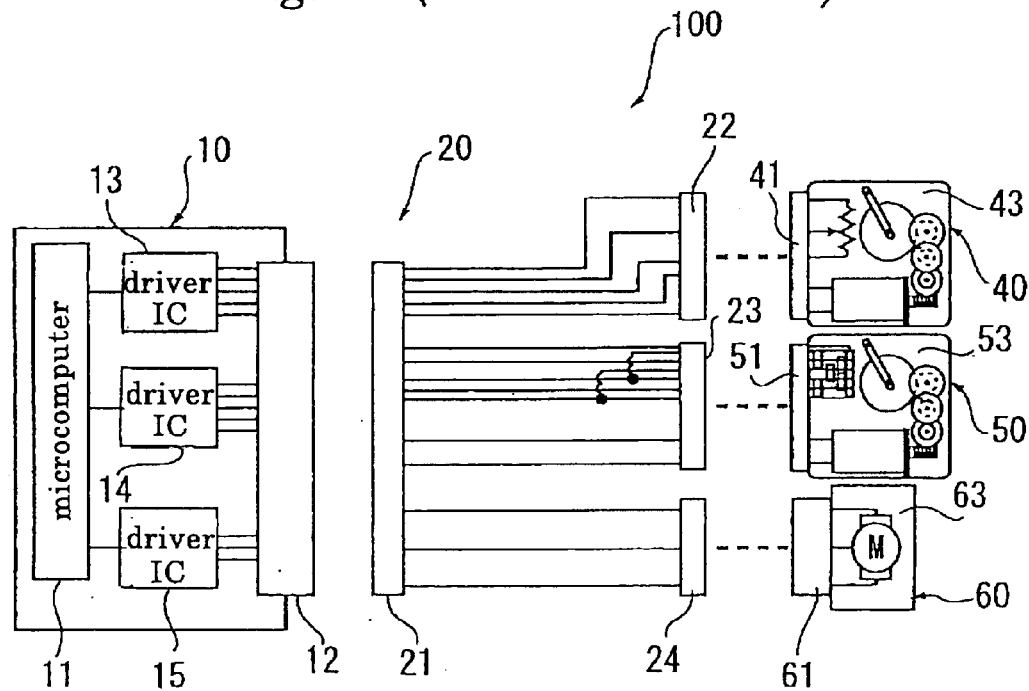
FIG. 2A is a schematic view showing a control apparatus of a conventional air conditioning system which corresponds to without data communication.
Figure 2B:
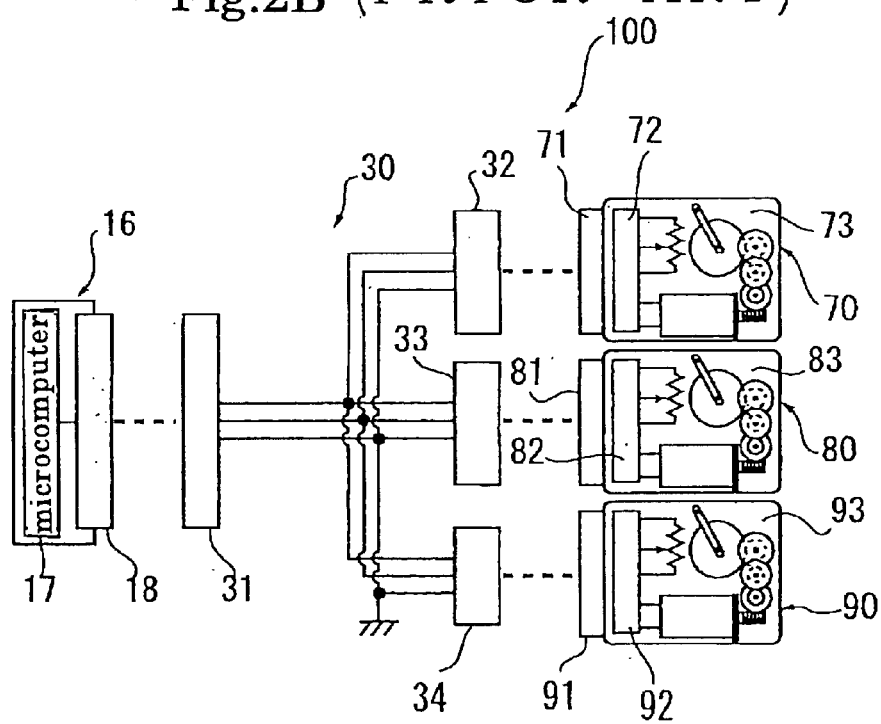
FIG. 2B is a schematic view showing a control apparatus of a conventional air conditioning system which corresponds to with data communication.

On the other hand, each of the actuators 40–60 in the embodiments are shared components which are also used for a control apparatus (door control apparatus) 100 which, as shown in FIG. 2A as the prior art, a driving control device (A/C amplifier unit) 10 and each of the actuators 40–60 are not networked and corresponds to "without data communication (parallel communication)" which carries out the driving and controlling of each of the actuators 40–60 by the A/C amplifier unit 10 by means of control of voltage value and current value to each of the actuators 40–60.

In addition, the actuator side connectors 22', 23' and 24' of the harness assembly 30 which corresponds to "with data communication" are formed identical connection configuration with actuator side connectors 22, 23 and 24 of a harness assembly 20 (see FIG. 2A) which corresponds to "without data communication".

Since the actuator side connectors 22', 23' and 24' of the harness assembly 30 which corresponds to "with data communication" are formed identical connection configuration with the actuator side connectors 22, 23 and 24 corresponded to "without data communication", the actuator side connectors 22', 23' and 24' corresponded to "with data communication" can be physically connected to the actuators 40, 50 and 60 which are corresponded to "without data communication". Furthermore, since the exclusive circuits (electrical circuits 35a, 36a, 37a and exclusive ICs 35b, 36b, 37b) which are exclusive for the data communication corresponded to "with data communication" are respectively included in the actuator side connectors 22', 23' and 24' of the harness assembly 30 which corresponds to "with data communication", the data communication can be carried out between the A/C amplifier unit 16 and each of the actuators 40–60 even if the actuator side connectors 22'–24', which are corresponded to "with data communication", are connected to the actuators 40–60 which are corresponded to "without data communication".

As another embodiment of the present invention, the door control apparatus 100 can also be structured to be in a design not to carry out the data communication, by substituting the above mentioned actuators 40–60 and the harness assembly 30 with, as shown in FIG. 2A as the prior art, the A/C amplifier unit 10 which corresponds to "without data communication (parallel communication)" and an interface (harness assembly) 20 which corresponds to "without data communication" when the data communication is not to be carried out.

Therefore, according to the door control apparatus 100 of the air conditioning system relating to the present embodiment, each of the actuators 40–60 can be shared with the door control apparatus which corresponds to "without data communication" so that an exclusive actuator which corresponds to "with data communication" does not have to be additionally prepared.

As a result, kinds of components are reduced, accordingly, trouble in components management can be decreased, and lowering in production cost can also be attained.

As described above, according to the door control apparatus of the air conditioning system relating to the present invention, because the connection configuration of the connector of the harness that is connected to the actuator is identical regardless of whether to carry out the data communication between the amplifier unit of the air conditioner and the actuator or not, and in the door control apparatus which carries out the data communication, the circuit for data communication, which has been provided in the actuator, is included in that connector, the same actuators can be used between the one that carries out the data communication and the one that does not carry out the data communication.

More specifically, according to the door control apparatus of the air conditioning system relating to the present invention, because the actuator side connector of the harness with connectors which corresponds to "with data communication" is identical in connection configuration with the actuator side connector of the harness with connectors which corresponds to "without data communication", the actuator side connector of the harness with connectors which corresponds to "with data communication" can be physically connected to the actuator corresponding to "without data communication". Furthermore, because the circuit for data communication, which has been provided in the actuator corresponded to "with data communication", is included in the actuator side connector of the harness with connectors which corresponds to "with data communication", the data communication can be carried out even when the actuator side connector of the harness with connectors which corresponds to "with data communication" is connected to the actuator corresponded to "without data communication".

Therefore, the actuator side connector of the harness with connectors which corresponds to "with data communication" can be physically and functionally connected to the actuator corresponded to "without data communication", as a result, the actuator corresponded to "with data communication" does not have to be prepared separately from the actuator corresponded to "without data communication".

Accordingly, trouble in components management can be reduced, and lowering in production cost can be attained.

What is claimed is:

1. A control apparatus for an air conditioning system comprising:
    an actuator which corresponds to data communication or does not correspond to the data communication for driving a connected device connected thereto;
    a driving control device for controlling said actuator; and
    an interface having at one end thereof a connector which is connected to said actuator and a connector which is connected to said driving control device at the other end;

wherein a circuit for data communication to carry out data communication carried out between said driving control device and said actuator via said interface is provided in said interface, and said connector connected to said actuator is connectable to both said actuator which corresponds to said data communication and said actuator which does not correspond to said data communication in order to provide the interface to be used for both said actuator corresponds to data communication and said actuator which does not correspond to said data communication.

2. The control apparatus for the air conditioning system according to claim 1, wherein said circuit for data communication is included in said connector connected to said actuator.

3. The control apparatus for the air conditioning system according to claim 2, wherein said driving control device outputs a driving control signal for controlling a plurality of actuators and an identification signal for specifying one or more of the actuators of said plurality of actuators to which the driving control signal is to be received, and said interface selectively outputs said driving control signal from said driving control device to said one or more of the actuators specified by said identification signal.

4. The control apparatus for the air conditioning system according to claim 3, wherein each of the actuators of said plurality of actuators actuates said connected device which corresponds to the actuator received the driving control signal when receiving said driving control signal, without having circuits for judging said identification signal.

5. The control apparatus for the air conditioning system according to claim 4, wherein said circuit for data communication judges said identification signal which specifies said actuator of said plurality of actuators, and selectively outputs said driving control signal to the actuator when judging that the identification signal is an identification signal specifying that actuator.

6. The control apparatus for the air conditioning system according to claim 5, wherein said actuator is selectively corresponded to whether or not carrying out the data communication by said interface being connected to said driving control device and said actuator when carrying out said data communication, and said actuator being connected to an interface which does not have the circuit for carrying out data communication and a driving control device which is not corresponded to said data communication when said data communication is not carried out.

7. The control apparatus for the air conditioning system according to claim 6, wherein said driving control device which corresponds to the data communication and said plurality of actuators are networked by Local Area Network, and said data communication is a data communication in said Local Area Network.

* * * * *